(12) United States Patent
Humbert et al.

(10) Patent No.: US 11,419,117 B2
(45) Date of Patent: *Aug. 16, 2022

(54) LOCATION-MATRIX BASED USER EQUIPMENT BAND SCANNING

(71) Applicant: T-Mobile USA, Inc., Bellevue, WA (US)

(72) Inventors: John Humbert, Roeland Park, KS (US); Scott Francis Migaldi, Cary, IL (US); Terri L. Brooks, Prosper, TX (US); Mark Younge, Golden, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,136

(22) Filed: Sep. 17, 2020

(65) Prior Publication Data

US 2021/0007102 A1    Jan. 7, 2021

Related U.S. Application Data

(63) Continuation of application No. 16/275,597, filed on Feb. 14, 2019, now Pat. No. 10,813,095.

(51) Int. Cl.
*H04W 72/04* (2009.01)
*H04W 64/00* (2009.01)
(Continued)

(52) U.S. Cl.
CPC ....... *H04W 72/0453* (2013.01); *H04W 64/00* (2013.01); *H04W 88/06* (2013.01); *H04W 88/08* (2013.01)

(58) Field of Classification Search
CPC . H04W 72/0453; H04W 64/00; H04W 88/06; H04W 88/08; G01S 5/0027
See application file for complete search history.

(56) References Cited

U.S. PATENT DOCUMENTS 6,424,837 B1 * 7/2002 Hall ..................... H04W 24/08
455/404.2
7,756,470 B2 * 7/2010 Roper ................ H04B 7/15507
455/11.1
(Continued)

FOREIGN PATENT DOCUMENTS

EP    1441468 A1    7/2004
EP    2690819 A2    1/2014

OTHER PUBLICATIONS

Corrected Notice of Allowability dated Jul. 7, 2020 for U.S. Appl. No. 16/275,597 (pp. 1-2).
(Continued)

*Primary Examiner* — Chandrahas B Patel
(74) *Attorney, Agent, or Firm* — Loeb & Loeb LLP

(57) ABSTRACT

An electronic device configured to operate in two frequency bands having significantly different coverage areas receives coordinates associated with a smaller coverage area over a frequency band having a larger coverage area. The coordinates allow the electronic device to only power up the associated radio and search for a base station of the smaller coverage area when the electronic device is in the area described by the coordinates. This allows the electronic device to achieve significant power savings compared to even infrequent random polling to determine when a base station of the smaller coverage area radio system is available.

20 Claims, 9 Drawing Sheets

(51) Int. Cl.
  *H04W 88/06* (2009.01)
  *H04W 88/08* (2009.01)

(56) References Cited

U.S. PATENT DOCUMENTS

| | | | |
|---|---|---|---|
| 8,644,190 | B2 | 2/2014 | Sachs |
| 10,798,710 | B1* | 10/2020 | Narendran .......... H04W 72/048 |
| 10,813,095 | B2 | 10/2020 | Humbert |
| 2005/0192009 | A1 | 9/2005 | Shaheen |
| 2011/0286437 | A1 | 11/2011 | Austin |
| 2016/0150432 | A1 | 5/2016 | Qin |
| 2019/0327714 | A1* | 10/2019 | Wang ................... H04B 7/0417 |
| 2020/0267727 | A1 | 8/2020 | Humbert |
| 2020/0396654 | A1* | 12/2020 | Freda ................... H04W 36/06 |

OTHER PUBLICATIONS

Extended European Search Report for App No. EP20154734.6, dated Apr. 21, 2020, 13 pages.
Notice of Allowance dated Jun. 17, 2020 for U.S. Appl. No. 16/275,597 (pp. 1-8).
Office Action dated Mar. 23, 2020 for U.S. Appl. No. 16/275,597. (pp. 1-8).
European Patent Office Communication pursuant to Article 94(3) EPC for App. No. EP20154734.6, dated Mar. 16, 2022, 10 pages.

\* cited by examiner

LOCATION-MATRIX BASED USER EQUIPMENT BAND SCANNING

CROSS-REFERENCE TO RELATED APPLICATIONS

This application is a continuation of and claims priority to U.S. patent application Ser. No. 16/275,597, filed Feb. 14, 2019, entitled "LOCATION-MATRIX BASED USER EQUIPMENT BAND SCANNING," the entire contents of which are incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An electronic device communicating via a wireless network must assess what networks are available for connections. Further, the electronic device must determine whether a more favorable network than the one in use is available. For example, a mobile device capable of cellular and WiFi connections may continuously scan for available WiFi networks when operating on a wide area cellular network. When a preferred WiFi network is available, the mobile device may switch from the cellular network to the WiFi network.

SUMMARY

In an embodiment, a mobile electronic device may operate in geographic areas covered by more than one network operating in different frequency bands. One network may provide for relatively wide area coverage, for example, with a radius on the order of kilometers. Another network may provide a radius of coverage of only hundreds of meters but may offer significantly faster connection speeds and represent the more desirable network from a performance perspective. However, for the electronic device to determine if a connection to the smaller coverage area network is available may require frequent checking of that network's radio band even though statistically the chance of being in the coverage area is relatively small. A result may be that a significant expenditure of energy may be devoted to determining if the more desirable network is available. This frequent checking has a negative impact on the battery life of the mobile unit by requiring the radio associated with the smaller coverage network to be frequently powered on to check for a signal in that band.

The need for blind checking for signal may be reduced, with a corresponding increase in battery life, by sending geographic indicators to the electronic device via the wider coverage area network. These geographic indicators describe where the smaller coverage area network signal is available. That way, the electronic device may activate the corresponding radio only when it is in or about to enter the specified coverage area. The geographic indicator may be in the form of a circle with a specified center and radius, or in the form of a shape, such as a polygon, with geographic coordinate vertices.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

For some time, electronic devices have been capable of communication on frequency bands with different coverage areas. For example, some cellular telephones operate on a licensed broadcast frequency as well as with a smaller coverage WiFi network. However, the electronic device must constantly search for suitable networks of both frequency bands. This searching requires radios operating in both bands to monitor for signals from base stations or access points with which communication can be established. In some cases, the electronic device may have a preference for one network over another, for example, based on cost, security, or data rates so that even though signal strength is adequate on one band, there is a preference to operate on the other band.

Figure 1:
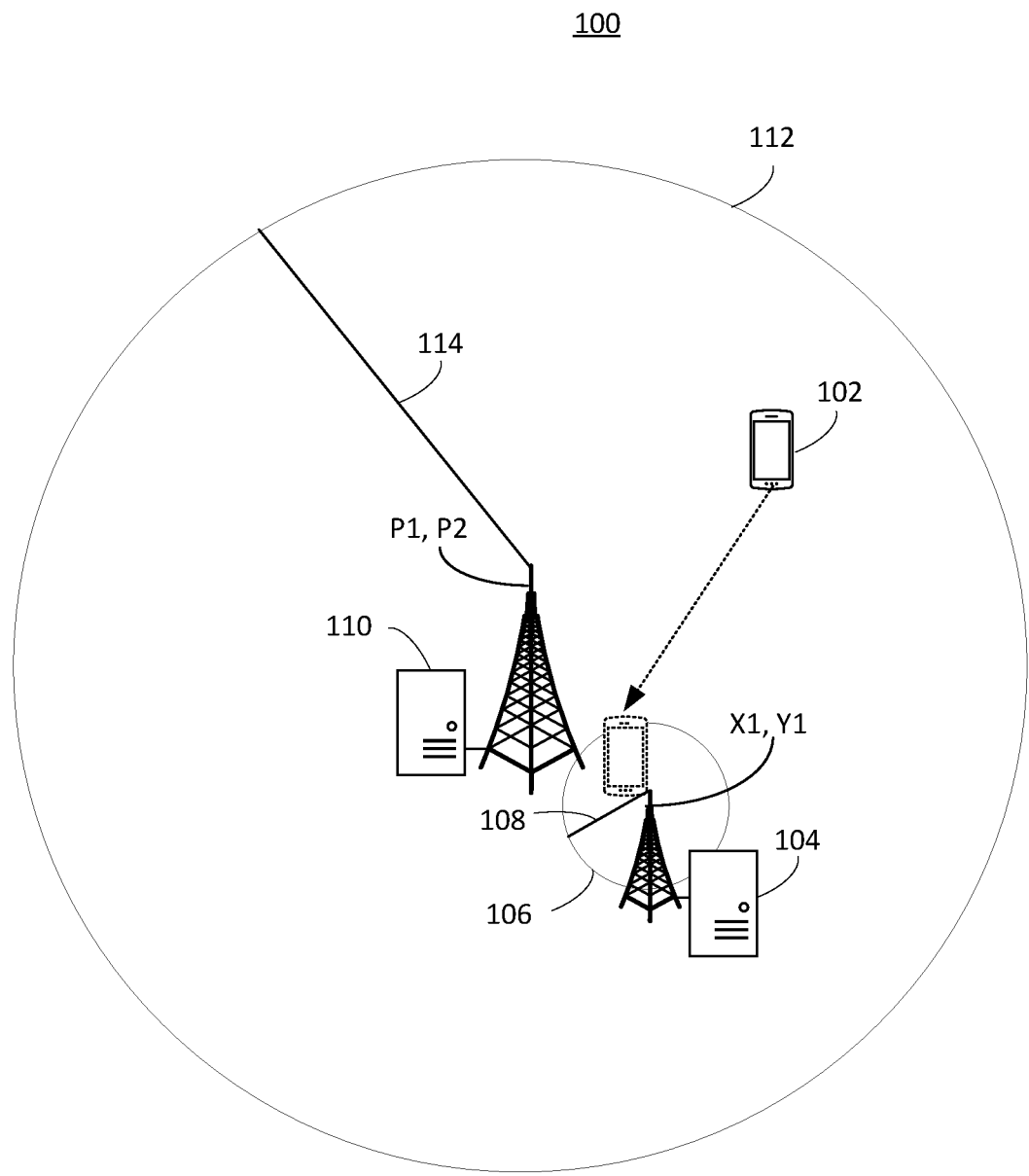
FIG. 1 is a system illustration of an embodiment of an electronic device operating in two frequency bands having disparate coverage areas in accordance with the current disclosure.

FIG. 1 illustrates a system 100 supporting operation of an electronic device 102 operating in dual band communication system with coverage areas in accordance with the current disclosure. In this exemplary embodiment, a first base station 104 may have a coverage area 106 defined by center point X1, Y1 and having a first radius 108. The first base station 104 may include a first radio supporting communication with the electronic device 102 via a radio operating at a first frequency band. A second base station 110 may have a coverage area 112 generally defined by a center point P1, P2 and radius 114. The second base station 110 may have a second radio supporting communication with the electronic device 102 over a second frequency band. Even though coverage areas of any radio system may vary due to terrain and other conditions, in various embodiments, the radio of the first base station 104 may operate at a lower power and/or may have a limited coverage area compared to the second base station 110.

At a time when the electronic device 102 is in the second (larger) coverage area and in communication with the second base station 110, the second base station 110 may send a descriptor of the first coverage area 106 to the electronic device 102. The descriptor may be in the form of a location and radius, as shown here, or may be individual points or locations, as discussed more below.

As shown in FIG. 1, the electronic device 102 may move from a portion of the coverage area 112 covered only by the second base station 110 to an area covered by both the first base station 104 and the second base station 110. A location device in the electronic device 102, such as a GPS receiver, may provide information used by the electronic device 102 to identify when the electronic device 102 is in the first coverage area 106 as denoted by the descriptor. When the electronic device 102 determines that communication with the first base station 104 should be available, a power management unit in the electronic device 102 may enable power for the radio that communicates with the first base station 110 followed by an attempt contact the first base station 104. After contact is made, any on-going communication with the electronic device 102 may be handed off to the first base station 104 from the second base station 110.

Figure 2:
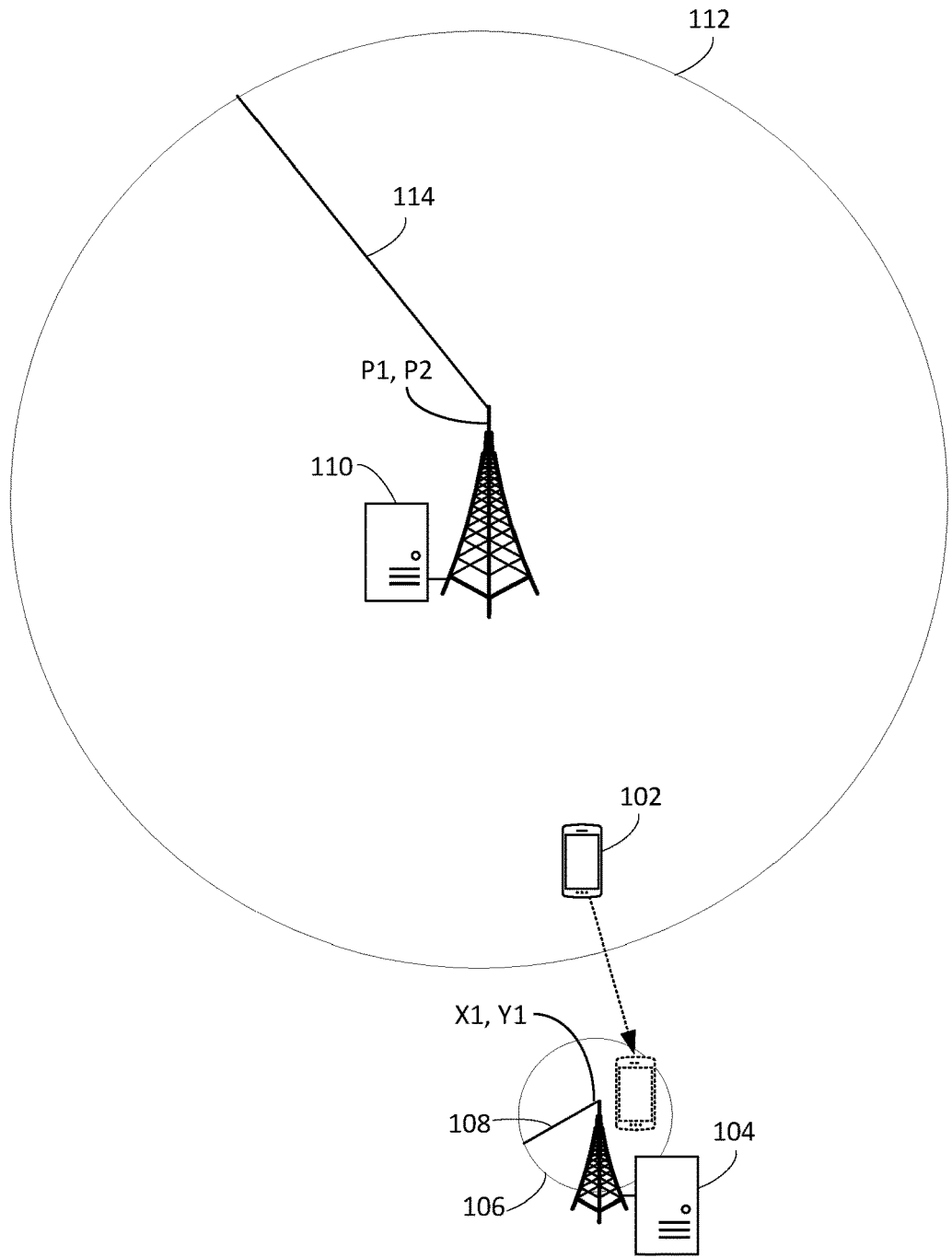
FIG. 2 is a system illustration of another embodiment of an electronic device operating in two frequency bands having disparate coverage areas in accordance with the current disclosure.

In some embodiments, the first and second base stations 104, 110 may be co-located, while in other embodiments, as shown here, the two base stations 104, 110 may be in different locations. In many cases, the first coverage area 106 may be contained in the second coverage area 112, but as shown in FIG. 2, this isn't necessary. As illustrated in the embodiment of FIG. 1, the first coverage area 106 is completely encompassed by the second coverage area 112. That is, the electronic device 102 could operate on the second frequency band at any time while operating on the first frequency band.

FIG. 2 illustrates another embodiment of location-matrix band scanning where the coverage areas 106 and 112 are not overlapping. In such an embodiment, the second base station 110 may still transmit a descriptor of the coverage area 106 of the first base station 104, even though the electronic device 102 may only connect to the first base station 104 after leaving the coverage area 112.

Figure 3:
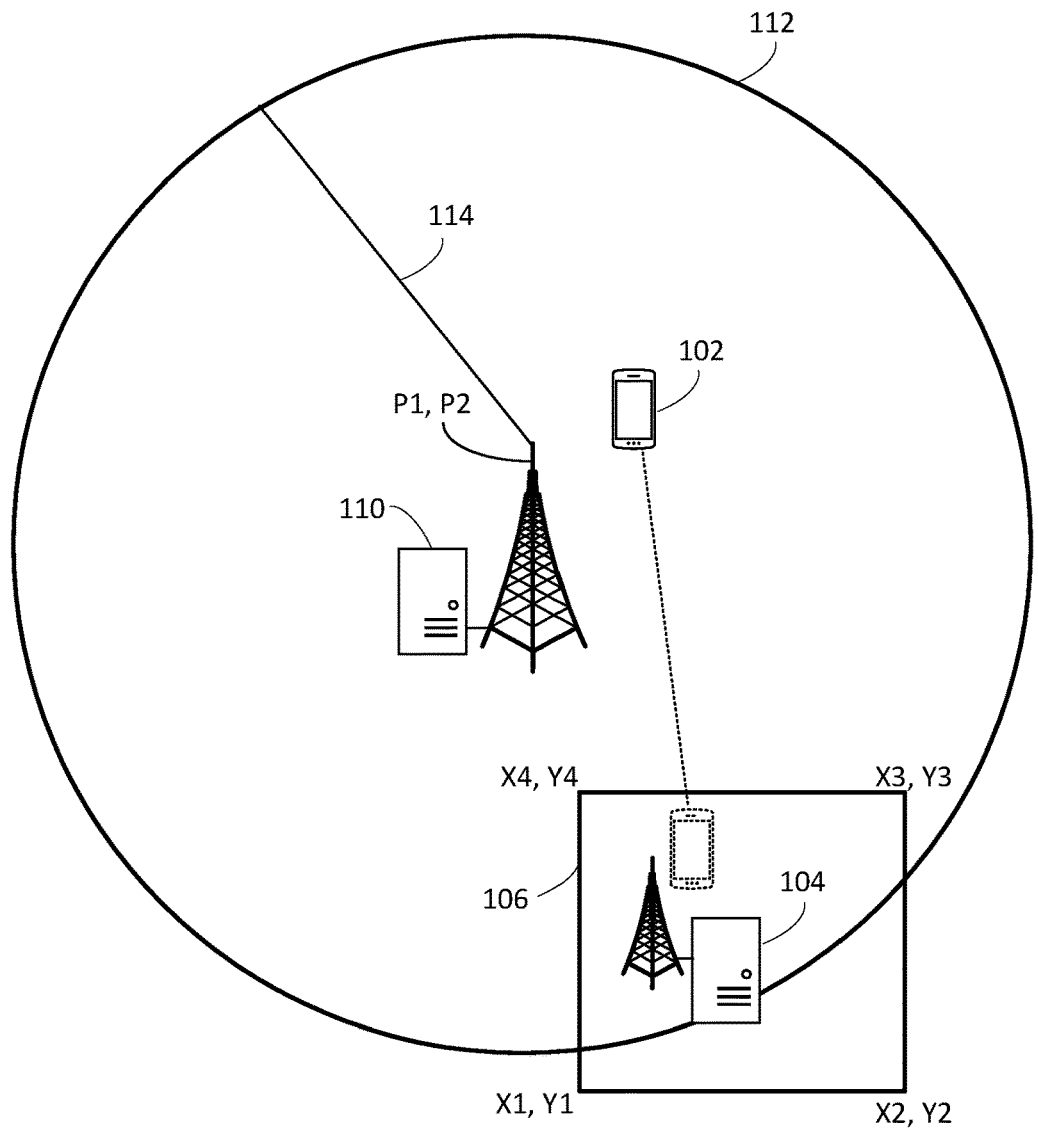
FIG. 3 is a system illustration of a third embodiment of an electronic device operating in two frequency bands having disparate coverage areas in accordance with the current disclosure.

Another embodiment of location-matrix band scanning may be illustrated in FIG. 3. Here, the coverage area 106 of the first base station 104 may only partially overlap the second coverage area 112. As above, the second base station 110 may provide the description of the first coverage area 106 even though the electronic device 102 may leave the coverage area 112 while communicating with the first base station 104. FIG. 3 also illustrates that in some embodiments the descriptor may not be in the form of a center point and radius as shown above but may be in the form of corner coordinates for a polygon. Even though the polygon illustrated has four corners, a valid descriptor may have any number of points more than two. For example, there may be areas where due to terrain or an urban canyon the shape of the coverage area 106 may be very irregular.

Figure 4:
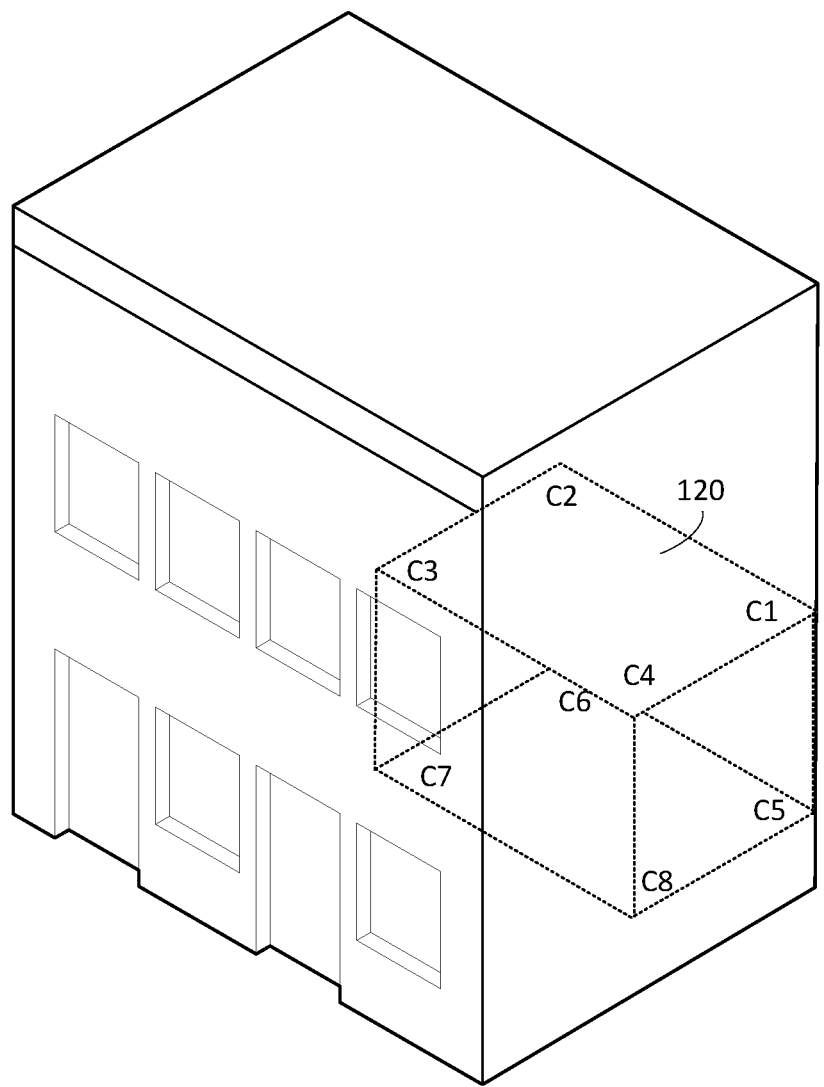
FIG. 4 is an illustration of a restricted space coverage area description in accordance with the current disclosure.
Figure 5:
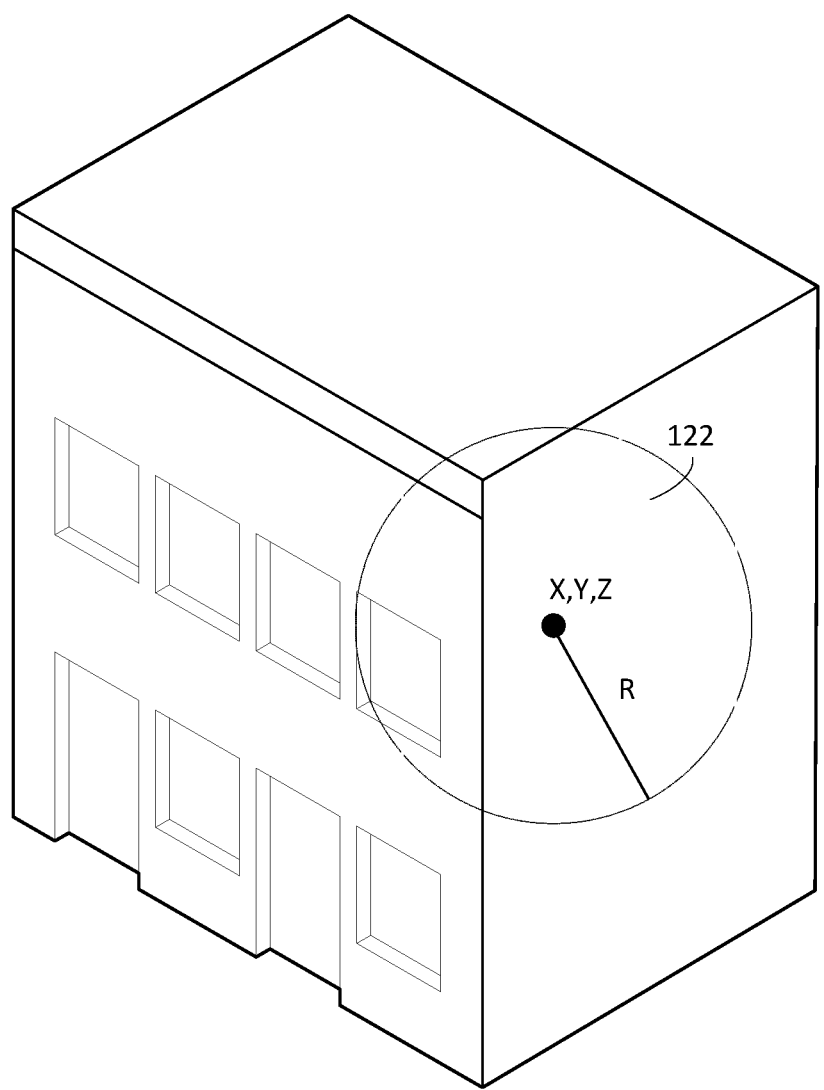
FIG. 5 is an illustration of another restricted space coverage area description in accordance with the current disclosure.

Another architecture supported by location-matrix band scanning may be illustrated in FIG. 4. In this illustration, a coverage area 120 for the first base station 104 (not shown in FIG. 4 for clarity sake) may be described in terms of a volume. The coverage area 120 may be described by a shape having corners C1-C8. These corners may represent in general terms the shape of a room or rooms in which coverage is available. For example, some very high frequency signals may be blocked by pre-stressed concrete walls so that coverage may be limited to line of sight. In one embodiment, corners may be described with x,y coordinates for geographic latitude and longitude. A z coordinate may be an elevation. In a similar embodiment illustrated in FIG. 5, a coverage area 122 may be expressed in terms of a three dimensional location and a radius. For example, the first base station 104 may have an output signal power level that allows calculation of coverage based on location and antenna type absent obstructions.

Figure 6:
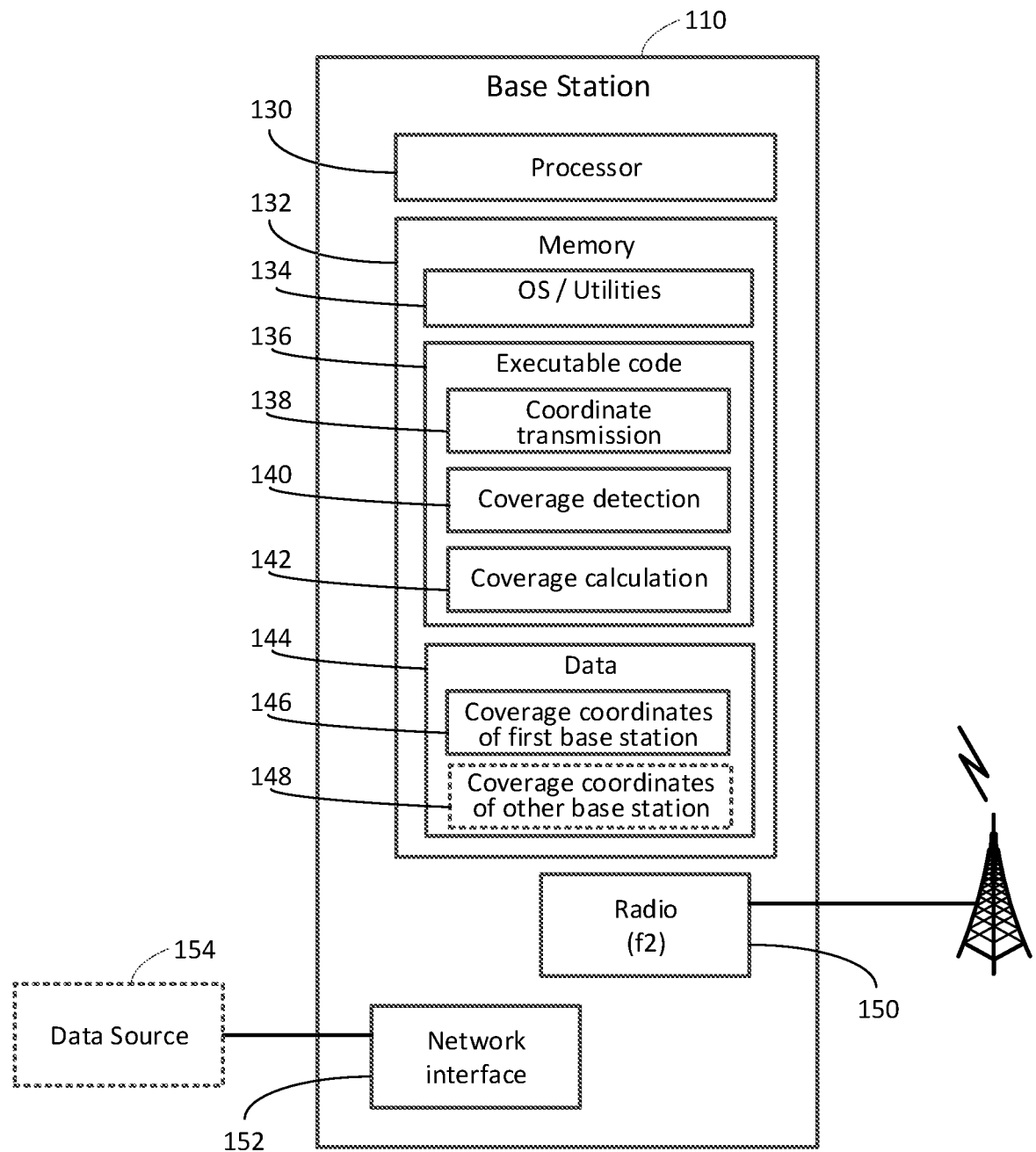
FIG. 6 is a block diagram of a base station configured for operation in a dual band radio system in accordance with the current disclosure.

FIG. 6 illustrates an exemplary block diagram of a base station 110 in accordance with the current disclosure. The base station 110 may include a processor 130 that is in communication with a memory 132. The memory 132 may include an operating system and utilities 134 used to manage operations of the base station including booting, memory management, communications, error handling, software updates, etc. The memory 132 may also store executable instructions 136 and data 144.

The base station 110 may have a radio 150 operating at a frequency band that provides for a coverage area 112 larger than that of another frequency band in use by the first base station 104. For example, the base station 110 may operate in a frequency band in the 700 MHz frequency range with a coverage radius 114 of as much as 7 kilometers. In many prior art systems, wide area coverage was provided by an overlapping network of similar band radios, operating at up to 2.5 GHz, but having similar coverage areas. 4G LTE is such an example. In such systems, the electronic device 102 may tell one base station when it is getting a stronger signal from another base station so that a handoff between base stations can be executed.

However, in the new 5G (fifth generation cellular) standard, a mixed system of low band (e.g., 700 MHz base stations) may be intermixed with millimeter wave radios operating in frequency bands around 50 GHz. These so called NR (new radio) radios may have a coverage radius of 500 meters or less depending on terrain and other obstructions. Unlike previous systems, the 5G implementation mixes these bands with significantly different coverage areas. As discussed above, this mismatch in coverage areas may cause an electronic device 102 operating these disparate bands a reduction in battery life simply because the electronic device 102 may need to constantly activate its NR radio in search of a signal even though it may be nowhere near an NR coverage area 106, 120, 122.

The base station 110 may also include a network interface 152 used for routing traffic from land-based switch gear (not depicted). The network interface 152 may also communicate with an external data source 154 as discussed more below.

The executable instructions 136 may include various modules or routines that are used for location-matrix based band scanning. For example, in an embodiment, the memory 132 may include a coordinate transmission module 138, a coverage detection module 140, and a coverage calculation module 142. The data 144 may include coverage coordinates 146, or descriptors, of the coverage area 106 of the first base station 104. The data 144 may also include coverage coordinates 148 for other base stations (not depicted) having small coverage areas compared to that of the second base station 110.

The coordinate transmission module 138 may be responsible for determining when an electronic device 102 is in the coverage area 112 of the base station 110 and to transmit coordinates of one or more smaller coverage areas 106 to the electronic device 102. As discussed above, the coverage area 106 may only be partially within its own coverage area 112, if at all. The coordinate transfer may be over the broadcast channel as data or may be transmitted over a control channel, as bandwidth permits.

Another code module may be the coverage detection module 140. Coverage detection may involve receiving location information from the electronic device 102 as the electronic device 102 is handed off either to or from the first base station 104. This location information may be combined with location information from other devices at the coverage calculation module 142 to form a locus of points defining the coverage boundary 106, 120, 122. The coordinate data 146 may then be updated accordingly. This may be valuable especially in the case of millimeter wave systems, where some atmospheric conditions, temporary construction, etc. may affect broadcast range. In another embodiment, coverage coordinates 146 may be received at the base station 110 from an external data source 154. The base station 110 may provide the location information from the electronic device 102 regarding coverage boundaries to the external data source 154 for use in refine the descriptors for the coverage area 106. In other embodiments, the coverage coordinates 146 may be determined by survey at the time of installation of the first base station 104 or may be independently updated separate from any live use by the electronic device 102.

Figure 7:
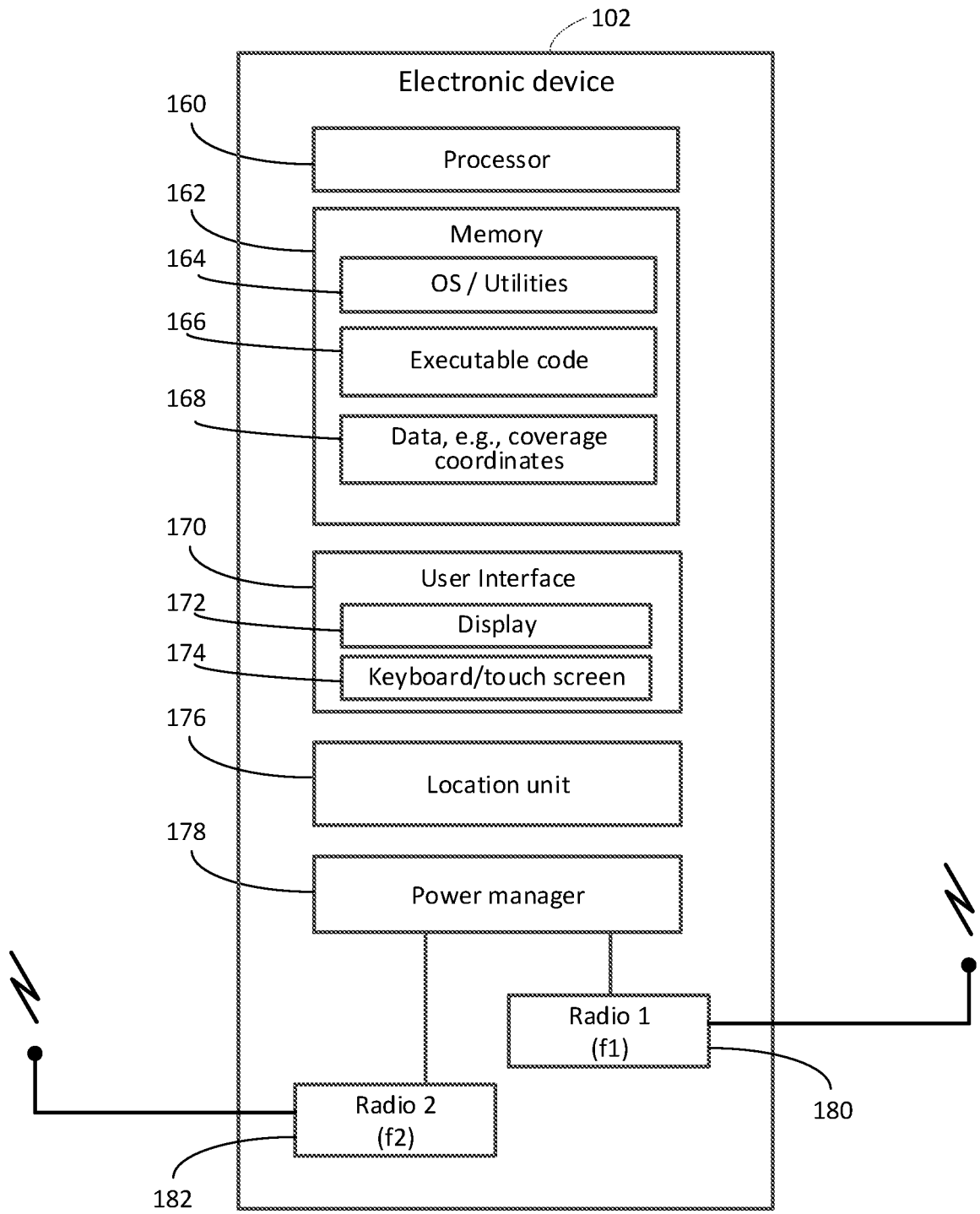
FIG. 7 is a block diagram of an electronic device configured for operation in the dual band radio system in accordance with the current disclosure.

An embodiment of an electronic device 102 may be illustrated in FIG. 7. The electronic device 102 may be a cellular telephone, a tablet, a laptop, etc. In other cases, the electronic device 102 may be any of a number of items that increasingly rely on network connectivity, such as a vehicle or an Internet of Things (IoT) device.

The electronic device 102 may include a processor 160 and memory 162 including an operating system and utilities 164, executable code 166 that may include both native and downloaded applications, and data memory 168. The data memory 168 may include coverage information for small coverage area frequency bands, such as coordinates or a descriptor as described above.

The electronic device 102 may also include a user interface 170 that itself may incorporate a display 172 and input device 174 such as a keyboard or touchscreen. The user interface 170 may be used to provide information to a user regarding the availability and/or activity on the first frequency band. For example, in a 5G network, a visual or auditory indicator may signal when the electronic device 102 is operating on a 5G millimeter wave cell. In another example, when a user is near a 5G NR cell, a map may be displayed via the display 172 showing the user the location of the NR cell along with the user's location. That way, the user may decide whether to travel to the NR cell should it provide a desirable performance or cost benefit.

A location unit 176 may include a GPS receiver but may also rely on cell tower triangulation, WiFi positioning (WPS), or other location techniques. (Unlike the currently disclosed system, WiFi positioning requires a mobile device to constantly monitor for WiFi SSID and MAC addresses and use those with an external database to infer the location of the device from the location the WiFi access point. The mobile device is required to continuously look for and identify WiFi access points at a possibly significant cost in battery life.)

The electronic device 102 may have at least two radio units. A first radio 180 may operate at a frequency band corresponding to the first base station 104. In the 5G example, this may be a millimeter wave radio operating in a range around 50 GHz. A second radio 182 may operate at a lower frequency, for example, in a more conventional 4G frequency band such as around 700 MHz up to around 2700 MHz. Of course, other radios may also be present, including Bluetooth, WiFi, NFC, or more.

A power manager 178 may control power delivered to various devices in the electronic device 102 based on operating mode in order to maximize battery life. For example, when the battery is low, the power manager 178 may reduce the brightness of the display 172. In the current example, the power manager 178 may turn off the first radio 180 when processor 160 determines that the electronic device 102 is not in a geographic area for which coverage is likely. This conclusion may be based on an analysis of coverage coordinates stored in the data memory 168 and a current location of the electronic device 102 based on information from the location unit 176. When a determination is made that the electronic device 102 is in or is likely to enter a coverage area 106 at the higher frequency band, the power manager 178 may activate the first radio 180 so that an attempt to establish communication with the first base station 104 may be initiated.

The illustrated examples above are simplified for convenience and ease of understanding. It should be understood that more complex arrangements of wide area and small area coverages are likely, including multiple high frequency cells with relatively small coverage areas in one coverage area 112 or small area coverages overlapping large coverage area boundaries.

Figure 8:
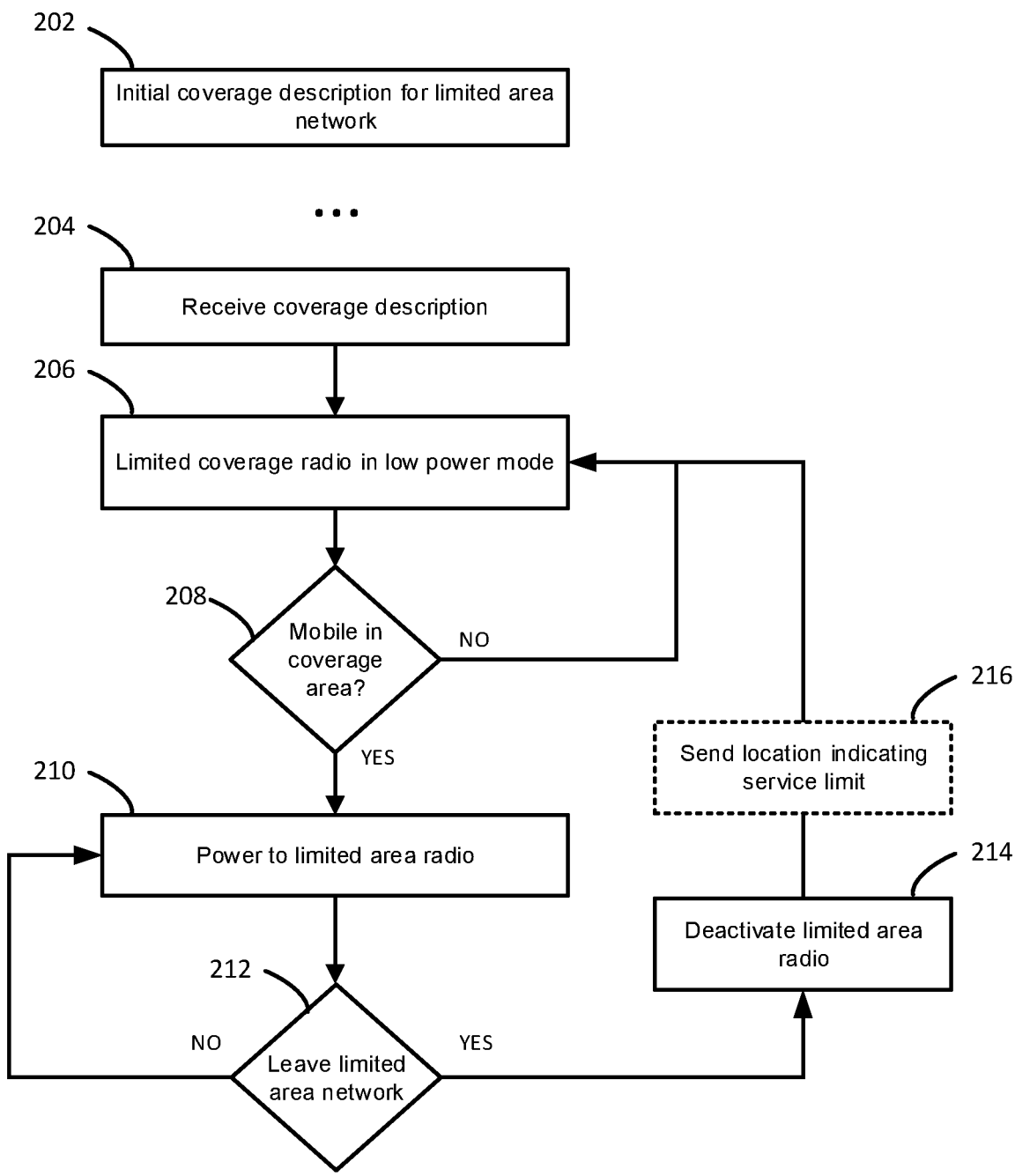
FIG. 8 is a flowchart of a method of operating the electronic device in the dual band systems illustrated in FIGS. 1-5.

FIG. 8 is a flowchart of a method 200 of operating an electronic device 102 in a dual-band radio environment. In an embodiment, the electronic device 102 may have a high frequency radio 180 operating in the 50-60 GHz frequency band. The electronic device 102 may also have a lower frequency radio 182 operating in one or more conventional cellular frequency bands, for example, between 700 MHz and 2700 MHz.

At block 202, a descriptor of a coverage area 106 of a first base station 104 may be developed. The descriptor may be in the form of either two dimensional or three dimensional geographic coordinates, as discussed above, but may also be described by a location, such as an address of a coffee shop. In one embodiment, the descriptor may result from an initial coverage survey. In another embodiment, the descriptor may be developed and/or refined by observation of electronic devices entering and leaving the coverage area 106. This observation of coverage area 106 may be relayed from the electronic device 102 to the base station 110. In other embodiments, the location of the electronic device 102 while in coverage may be relayed to the base station 104. In either case, a locus of points within the coverage area 106 may allow, over time, an accurate descriptor of the coverage area 106 to be generated.

At block 204, the electronic device 102 may receive the descriptor and store it in a data memory 168. Before or after receipt of the descriptor at block 204, at block 206, the electronic device 102 may place the first radio 180, that is the radio configured for use with the smaller coverage area base station 104, into a low power or off mode. In an embodiment, the power manager 178 may cause the first radio 180 to be powered down.

A code module 166 may, at block 208, make periodic comparisons between the descriptor of the coverage area 106 and the actual location of the electronic device 102 using data from the location unit 176. In one embodiment, this check may be once a minute. In another embodiment, the code module 166 may use a more sophisticated approach and factor in a current proximity to the coverage area 106, as well as direction and speed of the electronic device 102 to determine how often to check for proximity to the coverage area. For example, if velocity predictions indicate that the coverage area 106 may be nearby or approaching, the frequency of location checking may be increased. Conversely, since even making the location comparison requires some power, the frequency of location comparisons may be reduced when no coverage area 106 is nearby.

When the comparison at block 208 indicates that no coverage area 106 is proximate, the first radio is maintained in the low power state and execution continues at block 206. When the comparison at block 208 indicates that the electronic device 102 is proximate to or within the coverage area 106, at block 210, the power manager 178 may activate the first radio 180 so that a communication protocol may be followed to establish data communication with the associated base station 104.

At block 212, communication may continue with the first base station 104. When that communication ceases and the electronic device 102 is no longer in the first coverage area 106, the 'yes' branch from block 212 may be taken to block 214. Generally in conjunction with a communication hand off to the second base station 110, the electronic device 102 may deactivate or power down the first radio 180. Optionally, at block 216, the electronic device 102 may send location data to the second base station 110 indicating a location where the electronic device 102 lost coverage of the first base station 104. Alternatively, the electronic device 102 may routinely relay signal strength of the first base station 105 along with location data so that a more robust map of the coverage area 106 may be developed. In any case, the data received from the electronic device 102 may be used by the second base station 110 or the external data source 154 to update, as needed, the coverage descriptor of the first coverage area 106. Execution may continue at block 206 and the process repeated.

Figure 9:
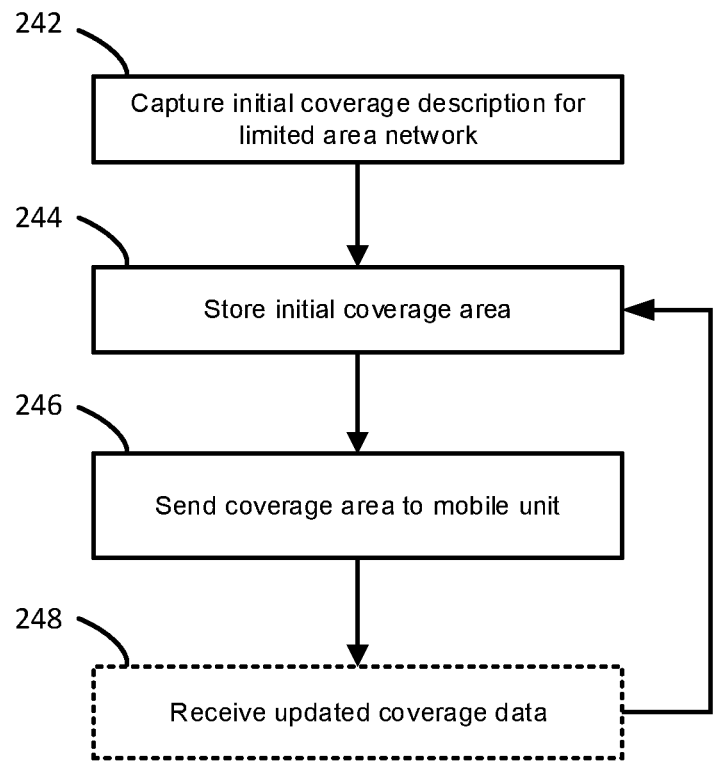
FIG. 9 is a flowchart of a method of operating the base station in the dual band systems illustrated in FIGS. 1-5.

FIG. 9 may be a flowchart of a method 240 of operating a base station 110 that broadcasts over a coverage area 112 in conjunction with a base station 104 that broadcasts over a smaller coverage area 106. At block 242, descriptor of the coverage area 106 of the base station 104 may be captured. As discussed above, this process may use any of several static and dynamic methods. The descriptor of the coverage area 106 may be stored at the base station 110, for example, in a memory 144 at block 244.

At block 246, the base station 110 may send the descriptor of the coverage area 106 to the electronic device 102. The electronic device's use of the descriptor is discussed above. A determination of whether to send the descriptor to the electronic device 102 may depend on the electronic device 102 having the ability to operate with the smaller coverage area base station 104. Optionally, at block 248, the base station 110 may receive a location indicator from the electronic device 102. The location indicator may correspond to the location of the electronic device 102 when communication with the base station 104 was lost, indicating a boundary of the coverage area 106.

At least one technical effect of the system and method described above is the power savings to the electronic device 102 resulting from not powering on the first radio 180 for the purpose of polling to see if a first base station 104 is in range. Another technical effect, in the case of a 5G embodiment, is reduced millimeter wave interference from electronic devices polling for a connection with an NR radio when no possible connection exists because no NR base stations are nearby. Another technical effect is the real time updates to coverage descriptors for NR base stations based on real time feedback from electronic devices starting and ending communication with the NR base station. The ability to save this data at a base station 110 on another frequency band makes capture of such information more robust, because the wider range of the, for example, 4G base station 110 allows more robust reporting of the location of the NR coverage edge.

The current system and method benefit both system operators and users of the electronic device 102. System operators have improved overall system performance from well-defined NR radio coverage areas as well as improved customer satisfaction from the increase in battery life afforded by having the radio 180 of the electronic device 102 powered only when the chance of connection is extremely high. Device users benefit from improved battery life while still enjoying the benefits of the higher performance NR radios when in a coverage area 106.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for improved performance in a dual-band radio environment, the system comprising:
    a first base station operating at a first frequency band having a first coverage area;
    a second base station operating at a second frequency band having a second coverage area, the second frequency band lower than the first frequency band and the second coverage area larger than the first coverage area; and an electronic device including:
        a first radio that communicates with the first base station using the first frequency band;
        a second radio that communicates with the second base station using the second frequency band, wherein the electronic device receives the descriptor of the first coverage area via the second radio;
        a location unit that locally determines a geographic location of the electronic device; and
        a power control unit coupled to the location unit, the power control unit activating the first radio when the electronic device is within the first coverage area based on the geographic location received from the location unit.

2. The system of claim 1, wherein the second base station includes a descriptor of the first coverage area.

3. The system of claim 2, further comprising the power control unit determining when the electronic device is within the first coverage area by comparing the geographic location to the descriptor of the first coverage area.

4. The system of claim 1, wherein the electronic device reports its location when operating on the first frequency band, the location used to determine the first coverage area.

5. The system of claim 1, wherein the electronic device reports its location via the second frequency band when a signal from the first base station is lost, the location used to determine the first coverage area.

6. The system of claim 1, wherein the first coverage area is completely encompassed by the second coverage area.

7. A base station for use in a dual-band communication system in conjunction with a first base station operating at a first frequency band and having a first coverage area, the base station comprising:
- a radio operating at a second frequency band, the radio in communication with an electronic device operable on either the first frequency band or the second frequency band;
- a processor coupled to the radio to send and receive data with the electronic device; and
- a memory storing executable instructions, the executable instructions causing the base station to transmit geographic coordinates describing the first coverage area to the electronic device for use by the electronic device in determining accessibility of the first base station.

8. The base station of claim 7, wherein the executable instructions further cause:
- the base station to capture a location of the electronic device corresponding to the electronic device being in communication with the first base station, and the base station to update the geographic coordinates describing the first coverage area responsive to capturing the location of the electronic device being in communication with the first base station.

9. The base station of claim 8, further comprising a network interface providing communication with a data source, the base station communicating the geographic coordinates of the first coverage area to the data source via the network interface.

10. The base station of claim 7, wherein the executable instructions cause an update to the geographic coordinates describing the first coverage area responsive to capturing a location of the electronic device corresponding to the electronic device being out of communication with the first base station.

11. The base station of claim 7, further comprising a network interface that communicates with a data source, the data source providing the coordinates describing the coverage area of the first base station.

12. An electronic device for use in a dual-band communication system, the electronic device comprising:
- a radio operating at a frequency band;
- a location unit that provides a location of the electronic device;
- a memory storing data and executable instructions;
- a power management unit that selectively controls power to at least the radio; and
- a processor coupled to the radio, the location unit and the memory, the processer responsive to instructions to:
  - determine, via the location unit, that the electronic device is in a coverage area of the base station based on a descriptor of the coverage area of the base station; and
  - cause the power management unit to supply power to the radio.

13. The electronic device of claim 12, wherein the executable instructions further cause the processor to notify another base station that the radio is on and in communication with the base station.

14. The electronic device of claim 12, wherein further executable instructions cause the processor to:
- determine an updated coverage boundary of a coverage area of the base station by monitoring a signal strength of the base station and comparing a location of the electronic device with a descriptor of the coverage area.

15. The electronic device of claim 14, wherein further executable instructions cause the processor to:
- transmit the location of the electronic device to one of the base station or the other base station when a mismatch is determined between the location and the descriptor of the coverage area.

16. The electronic device of claim 12, wherein the descriptor of the coverage area is a geographic point and a radius.

17. The electronic device of claim 16, wherein the descriptor of the coverage area further comprises an elevation of the geographic point.

18. The electronic device of claim 12, wherein the descriptor of the coverage area are geographic points describing a polygon.

19. The electronic device of claim 18, wherein the descriptor of the coverage area includes an elevation of at least a portion of the geographic points describing the polygon.

20. A method of operating an electronic device in a dual-band radio environment, the method comprising:
- determining, at an electronic device, that the electronic device is in a coverage area of a base station operating at a frequency band, the coverage area indicated by a descriptor of the coverage area; and
- responsive to determining that the electronic device is in the coverage area, activating, at the electronic device, a radio operating at the first frequency band.

* * * * *